(12) United States Patent
David et al.

(10) Patent No.: US 10,819,718 B2
(45) Date of Patent: Oct. 27, 2020

(54) METHODS AND SYSTEMS FOR DETECTING MALICIOUS WEBPAGES

(71) Applicant: DEEP INSTINCT LTD., Tel Aviv (IL)

(72) Inventors: Eli David, Holon (IL); Nadav Maman, Hod HaSharon (IL); Guy Caspi, Tel Aviv (IL)

(73) Assignee: DEEP INSTINCT LTD., Tel Aviv (IL)

( * ) Notice: Subject to any disclaimer, the term of this patent is extended or adjusted under 35 U.S.C. 154(b) by 160 days.

(21) Appl. No.: 15/641,851

(22) Filed: Jul. 5, 2017

(65) Prior Publication Data
US 2019/0014133 A1 Jan. 10, 2019

(51) Int. Cl.
| | | |
|---|---|---|
| *H04L 9/00* | (2006.01) | |
| *H04L 29/06* | (2006.01) | |
| *G06N 3/04* | (2006.01) | |
| *G06N 3/08* | (2006.01) | |
| *H04L 29/08* | (2006.01) | |

(52) U.S. Cl.
CPC .......... *H04L 63/1416* (2013.01); *G06N 3/04* (2013.01); *G06N 3/0445* (2013.01); *G06N 3/0454* (2013.01); *G06N 3/08* (2013.01); *G06N 3/084* (2013.01); *H04L 63/1483* (2013.01); *H04L 67/02* (2013.01)

(58) Field of Classification Search
CPC . H04L 63/1416; H04L 63/1483; H04L 67/02; G06N 3/04; G06N 3/08
See application file for complete search history.

(56) References Cited

U.S. PATENT DOCUMENTS

| | | | |
|---|---|---|---|
| 2010/0186088 A1* | 7/2010 | Banerjee | G06F 21/51 726/23 |
| 2015/0244728 A1* | 8/2015 | Tao | H04L 63/14 726/23 |
| 2016/0294862 A1* | 10/2016 | Tao | H04L 67/02 |
| 2018/0041530 A1* | 2/2018 | Tang | H04L 63/107 |
| 2018/0046941 A1* | 2/2018 | Sule | G06N 20/00 |
| 2018/0115565 A1* | 4/2018 | Kuo | H04L 63/101 |

(Continued)

OTHER PUBLICATIONS

Peter F. Likarish, "Early detection of malicious web content with applied machine learning", University of Iowa, 2011, pp. 1-159 (Year: 2011).*

(Continued)

*Primary Examiner* — Beemnet W Dada
(74) *Attorney, Agent, or Firm* — Browdy and Neimark, PLLC

(57) ABSTRACT

Methods and systems are disclosed for training a malicious webpages detector for detecting malicious webpages, based on a training set comprising a plurality of samples representing malicious and non-malicious webpages. Text content can be extracted from the source code of each sample, and/or non-text content can be extracted from each sample, in order to train respectively at least a first deep learning neural network and a second deep learning neural network of the malicious webpages detector. A malicious webpages detector can detect whether or not a webpage is malicious, by extracting text content from the source code of the webpage, and/or non-text content from the webpage, thereafter providing prospects that the webpage is malicious based on the extracted data.

22 Claims, 11 Drawing Sheets

(56) References Cited

U.S. PATENT DOCUMENTS

2018/0115573 A1* 4/2018 Kuo ..................... H04L 63/101

OTHER PUBLICATIONS

Y. Bengio (2009) Learning Deep Architectures for AI, Foundations and Trends in Machine Learning, vol. 2, Issue 1, pp. 1-127.
Y. LeCun, Y. Bengio, and G.E. Hinton (2015) Deep Learning, Nature, vol. 521, pp. 436-444.
Goodfellow, Y. Bengio and A. Courville (2016), Deep Learning, MIT Press.
Werbos, P., Beyond Regression: New Tools for Prediction and Analysis in the Behavioral Sciences, PhD thesis, Harvard Univ. (1974).
Parker, D. B. Learning Logic Report TR-47 (MIT Press, 1985).
Rumelhart, D. E., Hinton, G. E. & Williams, R. J., "Learning representations by back-propagating errors" Nature 323, 533-536 (1986).
Wikipedia: https://en.wikipedia.org/wiki/Backpropagation, Jul. 1, 2017.
Hinton, G. E., Osindero, S. & Teh, Y.-W., "A fast learning algorithm for deep belief nets", Neural Computation 18, 1527-1554 (2006).
Werbos P., "Backpropagation Through Time: What It Does and How to Do It", Proceedings of the IEEE, vol. 78, No. 10, Oct. 1990.

* cited by examiner

METHODS AND SYSTEMS FOR DETECTING MALICIOUS WEBPAGES

TECHNICAL FIELD

The presently disclosed subject matter relates to a solution for detecting malicious webpages.

BACKGROUND

Malicious webpages are webpages which can be used to disrupt computer operation, gather sensitive information, or gain access to private computer systems, when a user connects to said webpages.

A malicious webpage can comprise malicious content which is downloaded by the user's computer. Some malicious webpages can even harm the user's computer as soon as the webpage is loaded, before the user has downloaded any content from the webpage itself.

In the prior art, solutions have been proposed to handle the problem of detecting malicious webpages.

A first prior art solution relies on the detection of malicious webpages based on a repository of known malicious webpages. When a user tries to connect to a webpage, the browser or a dedicated protection module checks if the address of the webpage is part of the repository. If this is the case, the browser is prevented from loading the webpage. In this solution, detection of the malicious webpages depends on the update of the repository, and on the quality of the repository.

Another known solution is to analyze the operation of the malicious webpage, in order to identify the vulnerability of the computer or of the browser that the malicious webpage is using to harm the user's computer. Once such vulnerability has been identified, the code of the browser is then fixed to suppress this vulnerability.

There is thus a need to propose new methods and systems for detecting malicious webpages.

GENERAL DESCRIPTION

In accordance with certain aspects of the presently disclosed subject matter, there is provided a method of training a malicious webpages detector, wherein the malicious webpages detector comprises at least a first deep learning neural network and a second deep learning neural network operable on at least a processing unit, the method comprising providing a first subset of samples, each sample representing at least a malicious webpage, providing a second subset of samples, each sample representing at least a non-malicious webpage, training the malicious webpages detector to detect malicious webpages, said training comprising, for each sample of a plurality of samples of said first and second subsets, providing text content from at least a source code of the webpage represented by said sample providing prospects of whether said text content constitutes malicious content, using the first deep learning neural network, updating parameters of the first deep learning neural network based at least on a comparison between the prospects provided by said first deep learning algorithm neural network and the fact that the text content constitutes malicious or non-malicious content, and/or providing non-text content from said sample, providing prospects of whether said non-text content corresponds to malicious content, using the second deep learning neural network, updating parameters of the second deep learning neural network based at least on a comparison between the prospects provided by said second deep learning neural network and the fact that the non-text content constitutes malicious or non-malicious content.

In addition to the above features, the method according to this aspect of the presently disclosed subject matter can optionally comprise one or more of features (i) to (vii) below, in any technically possible combination or permutation:

i. the method comprises extracting the whole raw text content of the source code of the webpage represented by said sample, or at least part of the text content of said source code, and/or extracting non-text content from each sample;

ii. the method comprises providing data on each sample of the first subset, said data indicating if the text content and/or the non-text content of each sample constitutes malicious content;

iii. both the text content and the non-text content of each sample of the first subset constitute malicious content;

iv. a first group of samples of said first and/or second subsets represents webpages which are coded using at least a first programming language, and a second group of samples of said first and/or second subsets corresponds to webpages which are coded using at least a second programming language, the first programming language being different from the second programming language, and/or a first group of samples of said first subset represents webpages which are malicious for a first web browser, and a second group of samples of said first subset corresponds to webpages which are malicious for a second web browser, the first web browser being different from the second web browser, and/or a first group of samples of said first subset represents webpages which are malicious for a first operating system, and a second group of samples of said first subset corresponds to webpages which are malicious for a second operating system, the first operating system being different from the second operating system;

v. at least the first deep learning neural network comprises a Recurrent Neural Network;

vi. the Recurrent Neural Network is a Long Short-Term Memory network; and vii. the method comprises extracting text content from at least a source code of the webpage represented by said sample, wherein the text content comprises non-obfuscated content and obfuscated content, or only obfuscated content, deobfuscating said obfuscated content, and feeding the non-obfuscated content and the deobfuscated content, or only the deobfuscated content to the first deep learning neural network, for determining the prospects of whether said text content constitutes malicious content.

In accordance with some aspects of the presently disclosed subject matter, there is provided a method of training a malicious webpages detector, wherein the malicious webpages detector comprises at least one deep learning neural network operable on a processing unit, the method comprising providing a first subset of samples, each sample representing at least part of a malicious webpage, providing a second subset of samples, each sample representing at least part of a non-malicious webpage, training the malicious webpages detector to detect malicious webpages, said training comprising, for each sample of a plurality of samples of the first and the second subsets, providing prospects of whether text content present in a source code of the webpage constitutes malicious content, using said deep learning neural network, updating parameters of said deep learning neural network based at least on a comparison between the prospects provided by said deep learning algorithm neural network and the fact that the text content constitutes malicious or non-malicious content.

In addition to the above features, the method according to this aspect of the presently disclosed subject matter can optionally comprise one or more of features (iv) to (vii) mentioned above and one or more of features (viii) to (ix) below, in any technically possible combination or permutation:

viii. the method comprises, for each sample, a step of extracting said text content from said source code of the webpage represented by said sample; and
ix. each sample is said text content.

In accordance with some aspects of the presently disclosed subject matter, there is provided a method of training a malicious webpages detector, wherein the malicious webpages detector comprises at least one deep learning neural network operable on a processing unit, the method comprising providing a first subset of samples, each sample representing at least part of a malicious webpage, providing a second subset of samples, each sample representing at least part of a non-malicious webpage, training the malicious webpages detector to detect malicious webpages, said training comprising, for each sample of a plurality of samples of the first and the second subsets, providing prospects of whether non-text content of the sample constitutes malicious content, using said deep learning neural network, updating parameters of said deep learning neural network based at least on a comparison between the prospects provided by said deep learning algorithm neural network and the fact that the non-text content constitutes malicious or non-malicious content.

In addition to the above features, the method according to this aspect of the presently disclosed subject matter can optionally comprise one or more of features (iv) to (vi) mentioned above and one or more of features (x) to (xi) below, in any technically possible combination or permutation:

x. the method comprises, for each sample, extracting non-text content from said sample; and
xi. each sample is said non-text content.

In accordance with some aspects of the presently disclosed subject matter, there is provided a method of detecting a malicious webpage using a malicious webpages detector, wherein the malicious webpages detector comprises at least a first deep learning neural network and a second deep learning neural network operable on at least a processing unit, the method comprising, for a webpage, extracting text content from at least a source code of said webpage, providing first prospects of whether said text content constitutes malicious content, using the first deep learning neural network, and/or extracting non-text content from said webpage, providing second prospects of whether said non-text content constitutes malicious content, using the second deep learning neural network, and detecting if the webpage is malicious based at least on the first prospects and/or the second prospects.

In addition to the above features, the method according to this aspect of the presently disclosed subject matter can optionally comprise one or more of features (vi) to (vii) mentioned above and one or more of features (xii) to (xvi) below, in any technically possible combination or permutation:

xii. the first prospects comprise a probability that the text content constitutes malicious content, and/or a probability that the text content does not constitute malicious content, the second prospects comprise a probability that the non-text content constitutes malicious content and/or a probability that the non-text content does not constitute malicious content, and a webpage is detected as malicious if the first prospects and/or the second prospects do not comply with a threshold;
xiii. the method comprises, following the detection of a malicious webpage, performing a security action to avoid a connection of a user to said webpage or to limit the connection of the user to said webpage;
xiv. extracting the text content of the source code of a webpage comprises extracting the whole raw text content of the source code of the webpage, or at least part of it;
xv. the malicious webpages detector is operable for a plurality of different browsers used to access the webpage, and/or for a plurality of different operating systems on which a browser is used to access the webpage, and/or for a plurality of different programming languages of webpages; and
xvi. the text content comprises non-obfuscated content and obfuscated content, or only obfuscated content, and the method comprises deobfuscating said obfuscated content, feeding the non-obfuscated content and the deobfuscated content, or only the deobfuscated content, to the first deep learning neural network, and providing first prospects of whether said text content constitutes malicious content, using the first deep learning neural network.

In accordance with some aspects of the presently disclosed subject matter, there is provided a system for training a malicious webpages detector, wherein the malicious webpages detector comprises at least a first deep learning neural network and a second deep learning neural network operable on at least a processing unit, the system comprising a database storing a first subset of samples, each sample representing at least a malicious webpage, and a second subset of samples, each sample representing at least a non-malicious webpage, wherein the system is configured to train the malicious webpages detector to detect malicious webpages, said training comprising, by a processing unit, for each sample of a plurality of samples of the first and the second subsets, providing text content from at least a source code of the webpage represented by said sample, providing prospects of whether said text content constitutes malicious content, using the first deep learning neural network, updating parameters of the first deep learning neural network based at least on a comparison between the prospects provided by said first deep learning algorithm neural network and the fact that the text content constitutes malicious or non-malicious content, and/or providing non-text content from said sample, providing prospects of whether said non-text content corresponds to malicious content, using the second deep learning neural network, updating parameters of the second deep learning neural network based at least on a comparison between the prospects provided by said second deep learning neural network and the fact that the non-text content constitutes malicious or non-malicious content.

In addition to the above features, the system according to this aspect of the presently disclosed subject matter can optionally comprise one or more of features (xvii) to (xxiii) below, in any technically possible combination or permutation:

xvii. the system is configured to extract the whole raw text content of the source code of the webpage represented by said sample, or at least part of said source code, and/or to extract non-text content from each sample;
xviii. the database is configured to store information on each sample of the first subset, said information indicating if the text content and/or the non-text content of each sample constitutes malicious content;

xix. both the text content and the non-text content of each sample of the first subset constitute malicious content;

xx. a first group of samples of said first and/or second subsets represents webpages which are coded using at least a first programming language, and a second group of samples of said first and/or second subsets corresponds to webpages which are coded using at least a second programming language, the first programming language being different from the second programming language, and/or a first group of samples of said first subset represents webpages which are malicious for a first web browser, and a second group of samples of said first subset corresponds to webpages which are malicious for a second web browser, the first web browser being different from the second web browser, and/or a first group of samples of said first subset represents webpages which are malicious for a first operating system, and a second group of samples of said first subset corresponds to webpages which are malicious for a second operating system, the first operating system being different from the second operating system;

xxi. at least the first deep learning neural network comprises a Recurrent Neural Network;

xxii. the Recurrent Neural Network is a Long Short-Term Memory network; and xxiii. the system is configured to extract text content from at least a source code of the webpage represented by said sample, wherein the text content comprises non-obfuscated content and obfuscated content, or only obfuscated content, deobfuscate said obfuscated content, and feed the non-obfuscated content and the deobfuscated content, or only the deobfuscated content, to the first deep learning neural network, for determining the prospects of whether said text content constitutes malicious content.

In accordance with some aspects of the presently disclosed subject matter, there is provided a system for training a malicious webpages detector, wherein the malicious webpages detector comprises at least one deep learning neural network operable on a processing unit, the system comprising a database storing a first subset of samples, each sample representing at least part of a malicious webpage, a second subset of samples, each sample representing at least part of a non-malicious webpage, wherein the system is configured to train the malicious webpages detector to detect malicious webpages, said training comprising, by a processing unit, for each sample of a plurality of samples of the first and the second subsets, providing prospects of whether text content present in a source code of the webpage constitutes malicious content, using said deep learning neural network, and updating parameters of said deep learning neural network based at least on a comparison between the prospects provided by said deep learning algorithm neural network and the fact that the text content constitutes malicious or non-malicious content.

In addition to the above features, the system according to this aspect of the presently disclosed subject matter can optionally comprise one or more of features (xx) to (xxiii) mentioned above, in any technically possible combination or permutation.

In accordance with some aspects of the presently disclosed subject matter, there is provided a system for training a malicious webpages detector, wherein the malicious webpages detector comprises at least one deep learning neural network operable on a processing unit, the system comprising a database storing a first subset of samples, each sample representing at least part of a malicious webpage, a second subset of samples, each sample representing at least part of a non-malicious webpage, wherein the system is configured to train the malicious webpages detector to detect malicious webpages, said training comprising, by a processing unit, for each sample of a plurality of samples of the first and the second subsets, providing prospects of whether non-text content of the sample constitutes malicious content, using said deep learning neural network, and updating parameters of said deep learning neural network based at least on a comparison between the prospects provided by said deep learning algorithm neural network and the fact that the non-text content constitutes malicious or non-malicious content.

In addition to the above features, the system according to this aspect of the presently disclosed subject matter can optionally comprise one or more of features (xx) to (xxii) mentioned above, in any technically possible combination or permutation.

In accordance with some aspects of the presently disclosed subject matter, there is provided a system for detecting a malicious webpage, comprising at least a first deep learning neural network and a second deep learning neural network operable on a processing unit, the system being configured, for a webpage, to extract text content from at least a source code of said webpage, provide first prospects of whether said text content constitutes malicious content, using the first deep learning neural network, and/or extract non-text content from said webpage, provide second prospects of whether said non-text content constitutes malicious content, using the second deep learning neural network, and detect if the webpage is malicious based at least on the first and/or the second prospects.

In addition to the above features, the system according to this aspect of the presently disclosed subject matter can optionally comprise one or more of features (xxiv) to (xxix) below, in any technically possible combination or permutation.

xxiv. the first prospects comprise a probability that the text content constitutes malicious content, and/or a probability that the text content does not constitute malicious content, the second prospects comprise a probability that the non-text content constitutes malicious content and/or a probability that the non-text content does not constitute malicious content, and a webpage is detected as malicious if the first prospects and/or the second prospects do not comply with a threshold;

xxv. the system is configured, following the detection of a malicious webpage, to perform a security action to avoid a connection of a user to said webpage or to limit the connection of the user to said webpage;

xxvi. extracting the text content of the source code of a webpage comprises extracting the whole raw text content of the source code of the webpage, or at least part of it;

xxvii. the system is operable for a plurality of browsers used to access the webpage, and/or for a plurality of operating systems of the user accessing the webpage, and/or for a plurality of programming languages of the webpage.

xxviii. the system is located in a plug-in of a web browser, and/or in a proxy; and xxix. the text content comprises non-obfuscated content and obfuscated content, or only obfuscated content, and the system is configured to deobfuscate said obfuscated content, feed the non-obfuscated content and the deobfuscated content, or only the deobfuscated content, to the first deep learning neural network, and provide first prospects of whether said text content constitutes malicious content, using the first deep learning neural network.

In accordance with some aspects of the presently disclosed subject matter, there is provided a non-transitory storage device readable by a processing unit, tangibly embodying a program of instructions executable by a processing unit to perform a method of training a malicious webpages detector, wherein the malicious webpages detector comprises at least a first deep learning neural network and a second deep learning neural network operable on at least a processing unit, the method comprising training the malicious webpages detector to detect malicious webpages, said training comprising, for each sample of a plurality of samples of a first subset of samples, each sample representing at least a malicious webpage, and for each sample of a plurality of samples of a second subset of samples, each sample representing at least a non-malicious webpage, providing text content from at least a source code of the webpage represented by said sample, providing prospects of whether said text content constitutes malicious content, using the first deep learning neural network, updating parameters of the first deep learning neural network based at least on a comparison between the prospects provided by said first deep learning algorithm neural network and the fact that the text content constitutes malicious or non-malicious content, and/or extracting non-text content from said sample, providing prospects of whether said non-text content corresponds to malicious content, using the second deep learning neural network, updating parameters of the second deep learning neural network based at least on a comparison between the prospects provided by said second deep learning neural network and the fact that the non-text content constitutes malicious or non-malicious content.

In addition to the above features, the device according to this aspect of the presently disclosed subject matter can optionally comprise one or more of features (i) to (vii) below, in any technically possible combination or permutation.

In accordance with some aspects of the presently disclosed subject matter, there is provided a non-transitory storage device readable by a processing unit, tangibly embodying a program of instructions executable by a processing unit to perform a method of training a malicious webpages detector, wherein the malicious webpages detector comprises at least one deep learning neural network operable on a processing unit, the method comprising training the malicious webpages detector to detect malicious webpages, said training comprising, for each sample of a plurality of samples of a first subset of samples, each sample representing at least part of a malicious webpage, and of a second subset of samples, each sample representing at least part of a non-malicious webpage, providing prospects of whether text content present in a source code of the webpage constitutes malicious content, using said deep learning neural network, updating parameters of said deep learning neural network based at least on a comparison between the prospects provided by said deep learning algorithm neural network and the fact that the text content constitutes malicious or non-malicious content.

In addition to the above features, the device according to this aspect of the presently disclosed subject matter can optionally comprise one or more of features (iv) to (vii) and (viii) to (ix) mentioned above, in any technically possible combination or permutation.

In accordance with some aspects of the presently disclosed subject matter, there is provided a non-transitory storage device readable by a processing unit, tangibly embodying a program of instructions executable by a processing unit to perform a method of training a malicious webpages detector, wherein the malicious webpages detector comprises at least one deep learning neural network operable on a processing unit, the method comprising training the malicious webpages detector to detect malicious webpages, said training comprising, for each sample of a plurality of samples of a first subset of samples, each sample representing at least part of a malicious webpage, and for each sample of a plurality of samples of a second subset of samples, each sample representing at least part of a non-malicious webpage, each sample representing at least part of a non-malicious webpage, providing prospects of whether non-text content of the sample constitutes malicious content, using said deep learning neural network, updating parameters of said deep learning neural network based at least on a comparison between the prospects provided by said deep learning algorithm neural network and the fact that the non-text content constitutes malicious or non-malicious content.

In addition to the above features, the device according to this aspect of the presently disclosed subject matter can optionally comprise one or more of features (iv) to (vi) and (x) to (xi) mentioned above, in any technically possible combination or permutation.

In accordance with some aspects of the presently disclosed subject matter, there is provided a non-transitory storage device readable by a processing unit, tangibly embodying a program of instructions executable by a processing unit to perform a method of detecting a malicious webpage using a malicious webpages detector, wherein the malicious webpages detector comprises at least a first deep learning neural network and a second deep learning neural network operable on at least a processing unit, the method comprising, for a webpage, extracting text content from at least a source code of said webpage, providing first prospects of whether said text content constitutes malicious content, using the first deep learning neural network, and/or extracting non-text content from said webpage, providing second prospects of whether said non-text content constitutes malicious content, using the second deep learning neural network, and detecting if the webpage is malicious based at least on the first and/or the second prospects.

In addition to the above features, the device according to this aspect of the presently disclosed subject matter can optionally comprise one or more of features (vi) to (vii) and (xii) to (xvi) mentioned above, in any technically possible combination or permutation.

According to some embodiments, the proposed solution is able to provide prospects that a webpage is a malicious webpage, said prospects comprising at least a probability and/or a binary result.

According to some embodiments, the same malicious webpages detector can detect malicious webpages which are coded using different programming languages, and/or which are malicious for different browsers and/or which are malicious for different operating systems.

According to some embodiments, the proposed solution can detect which part of the webpage is malicious.

According to some embodiments, the proposed solution can provide prospects that a webpage is malicious even if this webpage has never been encountered previously by the malicious webpages detector.

According to some embodiments, the proposed solution can provide prospects that a webpage is malicious without needing to understand the source code of the malicious webpage in order to identify the vulnerability of the browser and/or of the operating system which is exploited by the malicious webpage to harm the user's computer. This changes the doctrine of detection of malicious webpages, since prior art solutions had to understand the operation and the code of each malicious webpage.

According to some embodiments, the detection of new malicious websites is achieved even if the user of the malicious websites detector cannot access a network for a certain period of time. The malicious websites detector may thus operate "offline" for a certain period of time. To the contrary, some prior art malicious websites detectors cannot detect new malicious websites as soon as one update of the database has been missed/undetected by the user, said updates occurring generally two to three times a day.

According to some embodiments, the solution can protect a single computer or a network of computers.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "providing", "extracting", "updating", "feeding", "extracting", "converting", "reducing", "training", "detecting", "deobfuscating" or the like, refer to the action(s) and/or process(es) of a processing unit that manipulate and/or transform data into other data, said data represented as physical, such as electronic, quantities and/or said data representing the physical objects.

The term "processing unit" as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), and an application specific integrated circuit (ASIC), etc.) capable of executing various data processing operations.

It can encompass a single processor or multiple processors, which may be located in the same geographical zone or may, at least partially, be located in different zones and may be able to communicate together.

The term "non-transitory memory" as used herein should be expansively construed to cover any volatile or non-volatile computer memory suitable to the presently disclosed subject matter.

Figure 1:
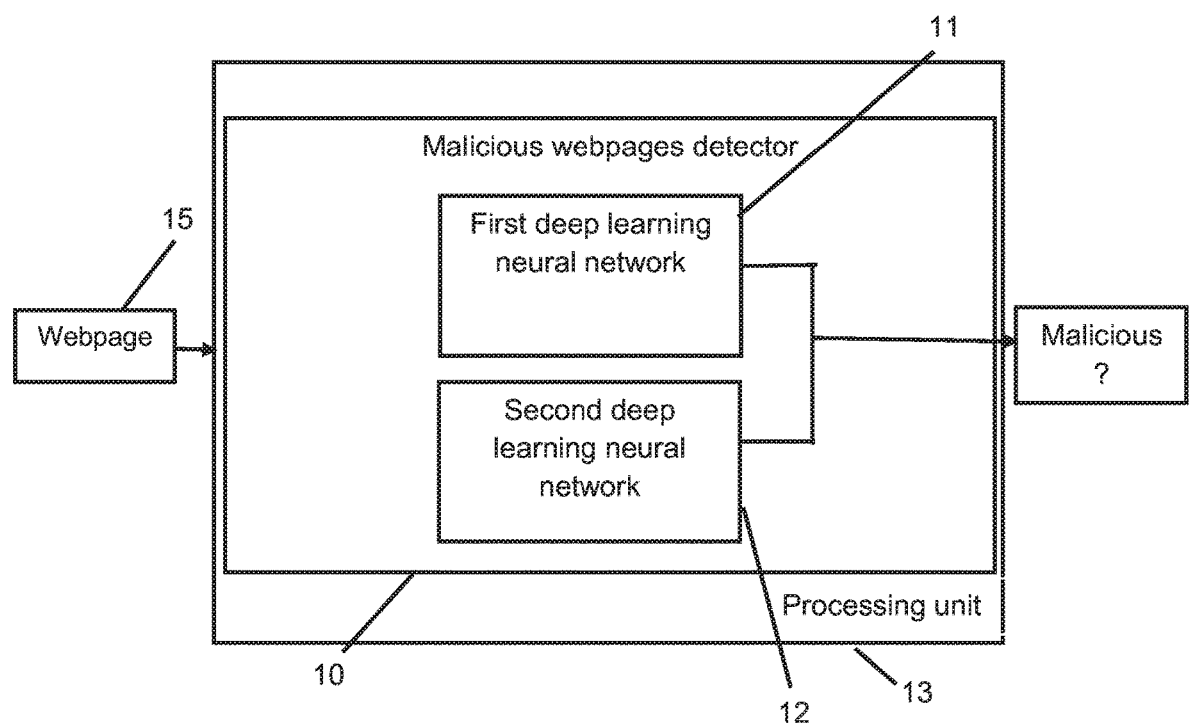
FIG. 1 illustrates an embodiment of a malicious webpages detector.

FIG. 1 illustrates an embodiment of a malicious webpages detector 10, which is configured to detect if a webpage 15 is malicious or not. As shown, the malicious webpages detector 10 can comprise a first deep learning neural network 11, which is operable on a processing unit, and a second deep learning neural network 12, which is operable on a processing unit. In this example, the first and the second deep learning neural networks are operable on the same processing unit 13, but this is not mandatory. According to some embodiments, the malicious webpages detector 10 can comprise a plurality of "first deep learning neural networks" and a plurality of "second deep learning neural networks".

Each deep learning neural network can comprise at least a deep learning algorithm. Deep learning is a branch of machine learning based on a set of algorithms that attempt to model high-level abstractions in data by using multiple processing layers with complex structures or otherwise, composed of multiple non-linear transformations.

Deep learning algorithms may be implemented in several ways, such as Deep neural networks, Deep belief networks, Convolutional neural networks, Convolutional Deep Belief Networks, Stacked (Denoising) Auto-Encoders, Deep stacking networks, Deep Recurrent Neural Networks.

Various articles describe the principles of deep learning algorithms, such as: Y. Bengio (2009) Learning Deep Architectures for AI, Foundations and Trends in Machine Learning, Vol. 2, Issue 1, pages 1-127, Y. LeCun, Y. Bengio, and G. E. Hinton (2015) Deep Learning, Nature, Vol. 521, pages 436-444, I. Goodfellow, Y. Bengio and A. Courville (2016), Deep Learning, MIT Press.

These documents are incorporated herein by reference.

According to some embodiments, the first and the second deep learning neural networks are not located at the same physical location (e.g. because they are running on different processing units which are not located at the same physical location).

According to some embodiments, at least the first deep learning neural network 11 comprises a Recurrent Neural Network (RNN).

Recurrent Neural Networks may be described as feed-forward neural networks in which the hidden neurons (that is to say the neurons of the hidden layers, the hidden layers being interposed between the input layer and the output layer) are connected to themselves (they thus receive the current input from time t and the past input from time t−1). As a consequence, they can take into account current data and also past data.

There are several types of RNN, e.g., standard RNN, deep RNN (with many hidden layers), LSTM (Long Short-Term Memory), etc.

According to some embodiments, the first deep learning neural network 11 comprises a LSTM network.

In order to be able to detect malicious webpages, the malicious webpages detector 10 can be trained.

Figure 2:
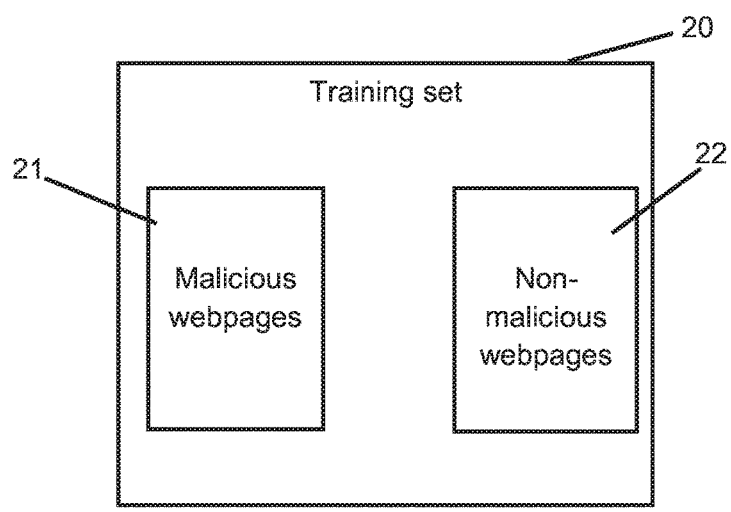
FIG. 2 illustrates an embodiment of a training set which can be used to train the malicious webpages detector.

FIG. 2 describes a possible training set 20 that can be used to train the malicious webpages detector. This training set 20 can be for example stored in a memory, such as a non-transitory memory.

According to some embodiments, the training set 20 can comprise a first subset 21 of samples, each sample representing at least a malicious webpage, and a second subset 22 of samples, each sample representing at least a non-malicious webpage.

These samples can be collected from various sources, such as from the Internet, and/or following past detections of malicious and non-malicious webpages, and/or from inputs of the users, and/or from public or private sources, etc.

According to some embodiments, the first and the second subsets 21, 22 of samples can comprise:
links to the webpages, and/or
at least part of the content of the webpages themselves, and/or
at least part of the source codes of the webpages, and/or
at least part of the source codes of the webpages after some pre-processing steps (such as deobfuscating steps, as explained later in the specification), and/or
a combination of at least part of this information, and/or other information representing the webpages.

As mentioned later in the specification, for each sample, text content can be extracted from the source code of the webpage, and non-text content can be extracted from the webpage (such as images, videos, etc.).

According to some embodiments, both the text content and the non-text content of each sample of the first subset 21 constitute malicious content. For example, the execution of the source code of the webpage causes malicious activity on the computer of the user, and the opening of an image of the webpage also causes malicious activity on the computer of the user.

According to other embodiments, only a part of each sample of the first subset 21 is malicious. This can be known in advance.

For example, only the non-text content is malicious and not the text content extracted from the source code. The reverse may also be possible.

According to some embodiments, it is possible to store data for each sample of the first subset 21, said data indicating which from the text content and/or the non-text content of each sample constitutes malicious content. This data can be for example a flag (such as a byte or a Boolean value), stored together with the training set in a non-transitory memory.

As described later in the specification, the training set can be used to train the malicious webpages detector 10 according to various training methods.

Figure 2A:
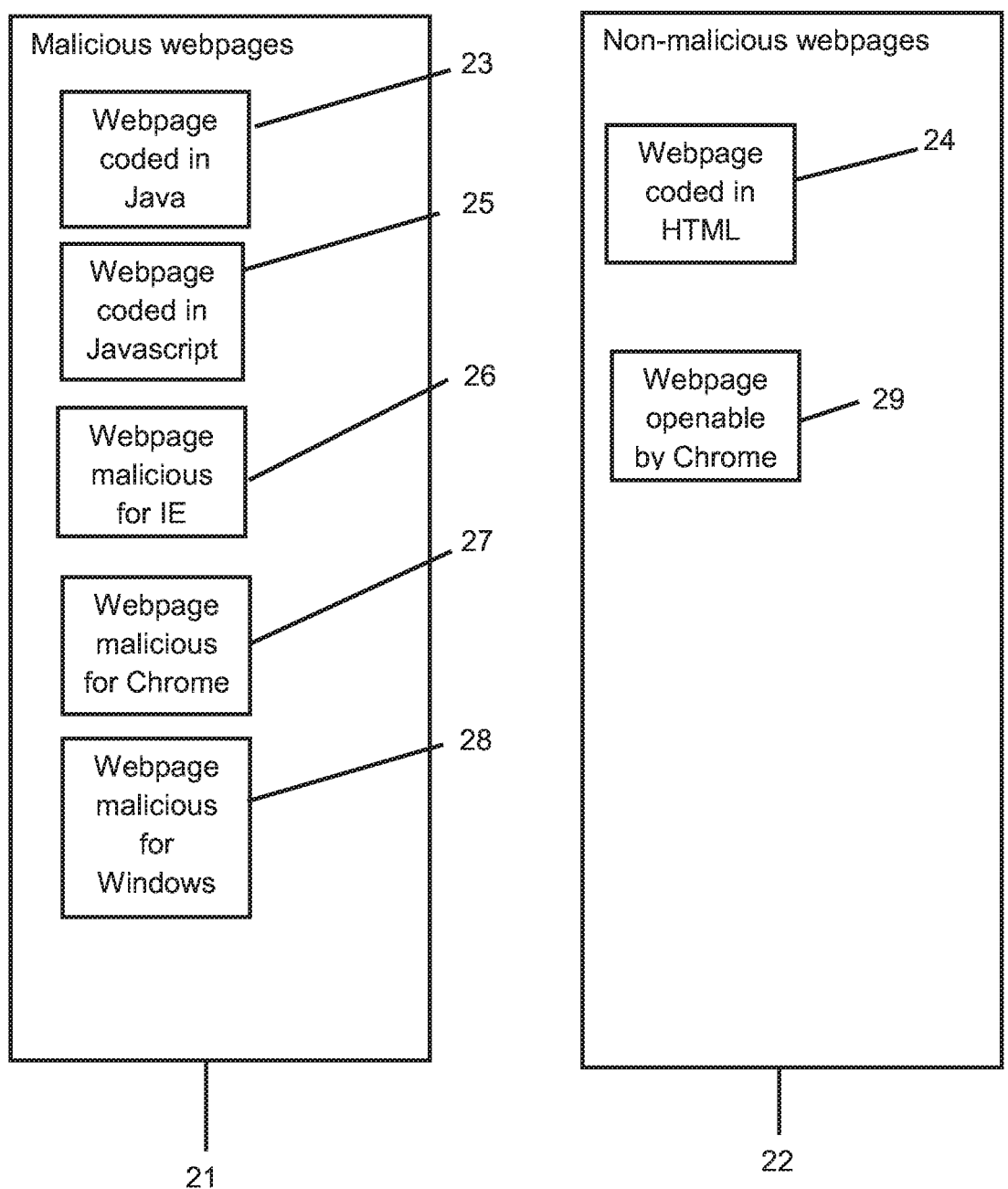
FIG. 2A illustrates examples of various different samples that can be part of the training set of FIG. 2.

FIG. 2A illustrates that the first and second subsets 21, 22 of the training set can comprise various different samples. These various samples can be used for training the same malicious webpages detector 10, although they are different in their format and nature.

According to some embodiments, a first group of samples of said first and/or second subsets 21, 22 represents webpages which are coded using at least a first programming language, and a second group of samples of said first and/or second subsets 21, 22 represents webpages which are coded using at least a second programming language, the first programming language being different from the second programming language.

In the non-limiting example of FIG. 2A, the first subset 21 comprises a malicious webpage 23 coded in Java, a malicious webpage 25 coded in Javascript, and the second subset 22 comprises a non-malicious webpage 24 coded in HTML.

According to some embodiments, a first group of samples of said first subset represents webpages which are malicious for a first web browser, and a second group of samples of said first subset represents webpages which are malicious for a second web browser, the first web browser being different from the second web browser.

In the non-limiting example of FIG. 2A, the first subset 21 comprises a webpage 26 which is malicious for the "Internet Explorer" browser only, and a webpage 27 malicious for the "Chrome" browser only. The second subset 22 comprises a webpage 29 which can be viewed properly only with the "Chrome" browser.

According to some embodiments, a first group of samples of said first subset 21 represents webpages which are malicious for a first operating system, and a second group of samples of said first subset represents webpages which are malicious for a second operating system, the first operating system being different from the second operating system.

In the non-limiting example of FIG. 2A, the first subset 21 comprises a webpage 28 which is malicious for the "Windows" operating system only.

Figure 3:
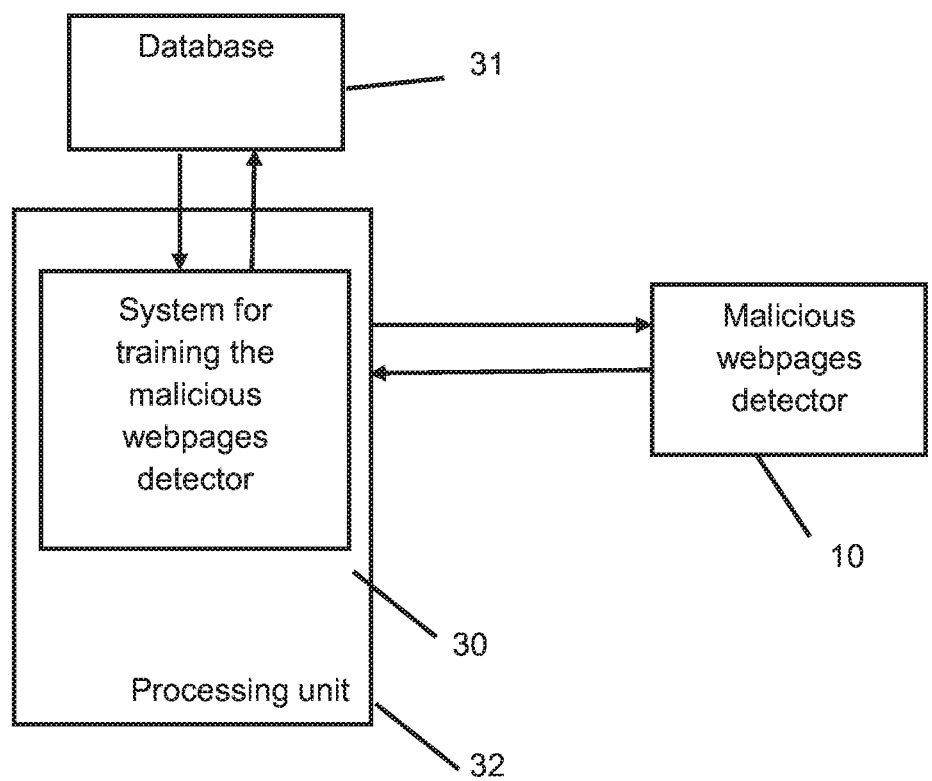
FIG. 3 illustrates an embodiment of a system for training the malicious webpages detector.

FIG. 3 illustrates an embodiment of a system 30 for training the malicious webpages detector 10.

The system 30 can comprise a database 31 storing one or more training sets, which were already described with respect to FIGS. 2 and 2A.

The system 30 can be operable on at least one processing unit 32, such as, but not limited to, a graphical processing unit.

Although FIG. 3 depicts the malicious webpages detector 10 as a distinct entity from the system 30, according to some embodiments the malicious webpages detector 10 is operable on the same processing unit as the system 30.

The system 30 can be configured to train the first deep learning neural network 11 and/or the second deep learning neural network 12 of the malicious webpages detector 10, so as to allow them to detect malicious webpages. As illustrated, the system can send data, such as a training set, to the malicious webpages detector, and can also receive data from the malicious webpages detector.

The system 30 can perform one or more training methods, such as the methods described below with reference to FIGS. 3A to 9.

Training methods, for training the malicious webpages detector 10 to detect malicious webpages, will now be described.

Figure 3A:
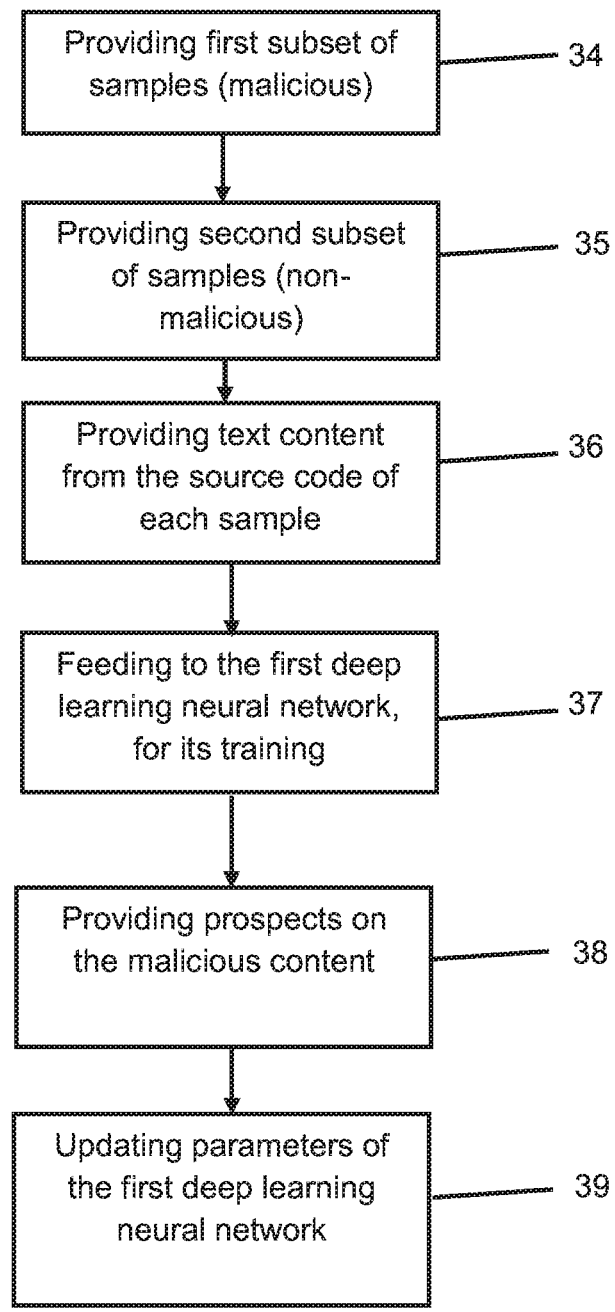
FIG. 3A illustrates an embodiment of a method of training the malicious webpages detector.

As shown in FIG. 3A, a training method can comprise providing (step 34) a first subset of samples, each sample representing at least a malicious webpage, and providing (step 35) a second subset of samples, each sample representing at least a non-malicious webpage. The first and the second subsets of samples can be similar to the subsets 21, 22 described with reference to FIGS. 2 and 2A.

The method can comprise a step 36 of providing text content from the source code of the webpage, for each sample.

According to some embodiments, step 36 can comprise extracting the source code of the webpage (a source code of a webpage can be accessed e.g. through the browser), and extracting text content from this source code. The text content can be for example the raw text content of the source code, which is extracted integrally or at least partially. This text content can for example comprise a succession of lines of codes which comprise instructions to the browser for displaying the webpage.

According to other embodiments, the samples provided at steps 34, 35 already correspond to the source codes of the webpages. In this case, a processing unit can directly extract the text content from the source code, and there is no need to first extract the source code from the webpage.

The text content can then be fed to the first deep learning neural network 11 (step 37). The first deep learning neural network 11 then provides prospects (step 38) of whether said text content constitutes malicious content. In particular, the first deep learning neural network 11 attempts to provide prospects of whether the text content originates from the source code of a malicious webpage. These prospects are provided by the deep learning algorithm present in the first deep learning neural network 11.

The prospects can comprise for example a probability (e.g. a probability X that the text content constitutes malicious content, and/or a probability 1-X that the text content constitutes non-malicious content).

Since it is known in advance whether or not the sample that was fed to the first deep learning neural network constitutes malicious or non-malicious content (as explained with reference to FIG. 2), it is thus possible to train the first deep learning neural network, based on the comparison between the calculated prospects and the "true" malicious character, or non-malicious character, of the sample.

The training method can comprise a step 39 of updating parameters (also called weights or coefficients) of the first deep learning neural network based at least on a comparison between the prospects provided by said first deep learning algorithm neural network and the fact that the text content constitutes malicious or non-malicious content.

This update can rely on the method of "Backpropagation". This method is for instance described in Werbos, P., Beyond Regression: New Tools for Prediction and Analysis in the Behavioral Sciences, PhD thesis, Harvard Univ. (1974), Parker, D. B. Learning Logic Report TR-47 (MIT Press, 1985), Rumelhart, D. E., Hinton, G. E. & Williams, R. J., Learning representations by back-propagating errors, Nature 323, 533-536 (1986), and in the webpage of Wikipedia: ttps://en.wikipedia.org/wiki/Backpropagation. These documents are all herein incorporated by reference. Another method includes the "Contrastive Divergence" method, which is for instance described in Hinton, G. E., Osindero, S. & Teh, Y.-W., A fast learning algorithm for deep belief nets, Neural Computation 18, 1527-1554 (2006). This document is herein incorporated by reference.

The steps described in FIG. 3A can be repeated iteratively with a large number of samples, until e.g. the prospects provided by the first deep learning neural network are considered as satisfactory (such as because the prediction error of the first deep learning neural network is below a given threshold, for at least a given percentage of the samples).

According to some embodiments, and as mentioned with reference to FIG. 1, the first deep learning neural network 11 can comprise a Recurrent Neural Network (such as, but not limited to, a Long Short-Term Memory network).

The parameters/weights of a Recurrent Neural Network may be updated using a variation of a backpropagation algorithm (which is used for training standard feedforward neural networks). This variation is called "*Backpropagation through time*", and is described e.g. in the article "*Backpropagation Through Time: What It Does and How to Do It*", Werbos P., Proceedings of the IEEE, Vol. 78, No. 10, October 1990, which is incorporated herein by reference.

This update may affect the weights (also called synapses) connecting the neurons (which are the different units of a layer) and can also affect the recurrent weights, which are the weights connecting neurons in the same hidden layer.

The method of FIG. 3A can be performed by the system 30 or by another processing unit.

Figure 4:
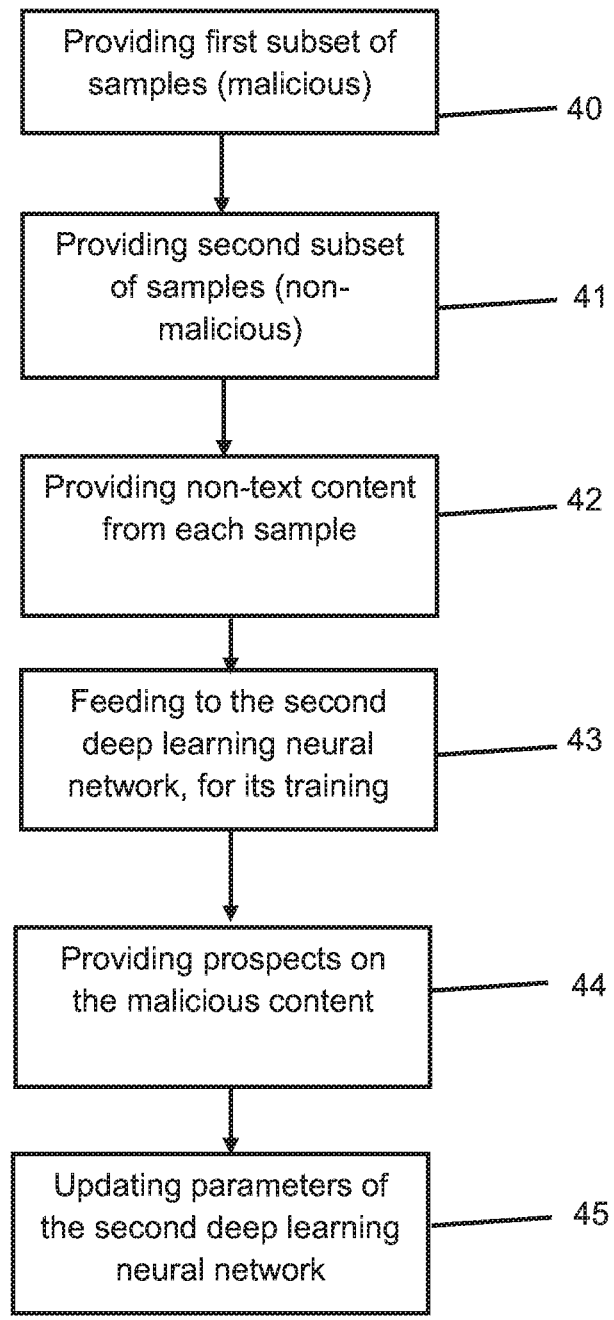
FIG. 4 illustrates an embodiment of another method of training the malicious webpages detector.

FIG. 4 describes further steps of a method of training the malicious webpages detector 10. The method of 4 can be performed by the system 30 or by another processing unit.

As mentioned later in the specification, according to some embodiments, this method can be combined with the method of FIG. 3.

The method can comprise steps 40 and 41 of providing a first subset of malicious samples and a second subset of non-malicious samples, these steps being similar to steps 34 and 35 described with reference to FIG. 3A.

The method can then comprise a step 42 of providing non-text content from at least part of the samples.

As mentioned, each sample can represent at least a webpage. A webpage generally comprises non-text content, such as images, videos, animated content, etc.

Step 42 can thus comprise extracting this non-text content from the sample. For example, the non-text content which is extracted can comprise a file such as a ".JPEG" file, a ".AVI" file, a Flash file, a GIF file, etc. This list is however not limitative.

According to some embodiments, the system 30 can scan the source code of the webpage to detect particular string(s) that indicate that non-text content is present, in order to obtain or download (if applicable) the corresponding non-text content.

Indeed, programming languages generally comprise predefined strings (such as tags) which indicate to the browser that non-text content has to be downloaded and displayed. For example, in HTML, the tags "<img>" or "<img src=>" can be used to define the presence of an image in the website. These examples are however not limitative.

If necessary, the format of the non-text content file can also be recognized.

According to some embodiments, the first subset and the second subset of samples already store, for each sample, data corresponding to the non-text content of each webpage (for example because the non-text content has already been extracted by a third party). In this case, it is not necessary to perform an extraction of the non-text content, since the non-text content is already extracted from the webpage and ready to be accessed in the training set.

The non-text content can then be fed (step 43) to the second deep learning neural network, for its training.

The non-text content which is fed to the second deep learning neural network can comprise binary data which represent said non-text content.

For example, an image is described as a succession of bytes each representing the pixel of the image, which are stored in the image file. These binary data can be extracted from the image file, and can be fed to the second deep learning neural network, for its training. This applies also to a video which is also defined as a succession of bytes, or to other non-text content. If necessary, if the size of the non-text content is above a threshold, the system can select only a part of the non-text content (such as for example the first N minutes of a video).

The second deep learning neural network 12 then provides prospects (step 44) of whether said non-text content constitutes malicious content. These second prospects can be provided by the deep learning algorithm present in the second deep learning neural network 12.

The second prospects can comprise for example a probability (e.g. a probability X that the non-text content constitutes malicious content, and/or a probability 1-X that the non-text content constitutes non-malicious content).

Since it is known in advance if the non-text content of the sample that was fed to the second deep learning neural network constitutes malicious or non-malicious content (as explained with reference to FIG. 2), it is thus possible to train the second first deep learning neural network based on the comparison between the returned prospects and the "true" malicious character or non-malicious character of the non-text content.

The training method can comprise a step 45 of updating parameters (also called weights or coefficients) of the second deep learning neural network based at least on a comparison between the prospects provided by said first deep learning algorithm neural network and the fact that the text content constitutes malicious or non-malicious content.

This update can rely e.g. on the method of "Backpropagation", as already mentioned with reference to FIG. 3A, or "Backpropagation through time" in the case of a Recurrent Neural Network.

The steps described in FIG. 4 can be repeated iteratively with a large number of samples, until e.g. the prospects provided by the second deep learning neural network are considered as satisfactory (such as because the prediction error of the second deep learning neural network is below a given threshold, for at least a given percentage of the samples).

The system 30 for training the malicious webpages detector can perform the training methods of FIG. 3A and FIG. 4 according to various combinations or orders.

Figure 5:
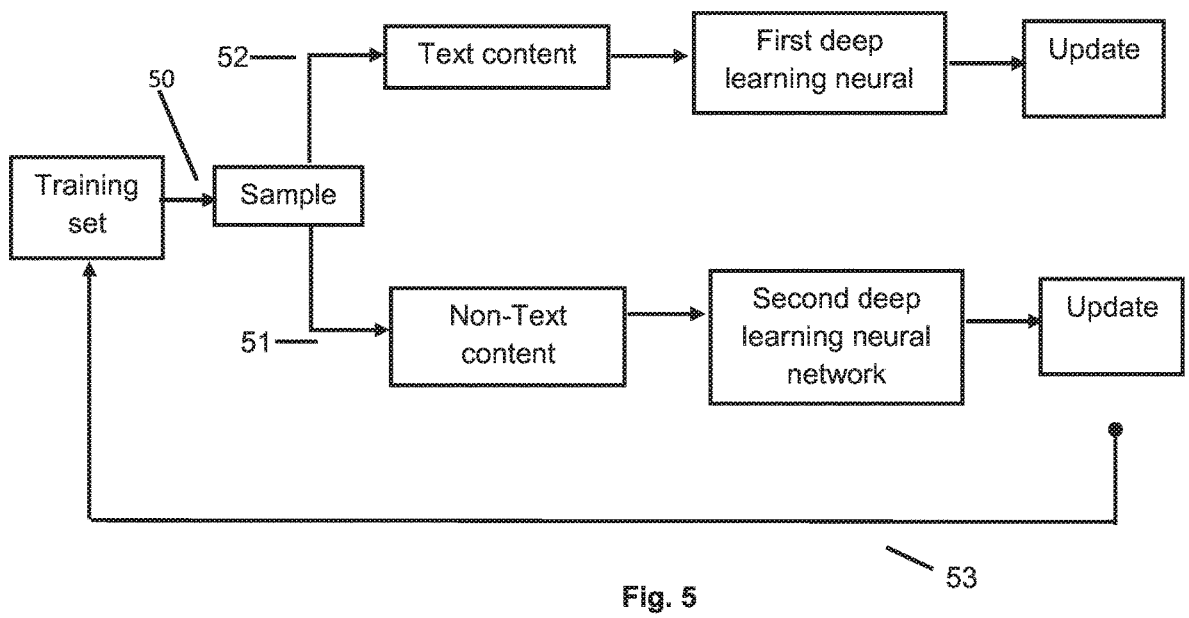
FIG. 5 illustrates a possible combination of the training methods of FIG. 3A and of FIG. 4.

According to some embodiments, and as illustrated in FIG. 5, the system 30 selects, at each iteration of the method, a sample (step 50) from the first subset of samples or from the second subset of sample (this selection can, for example, be performed randomly).

If the sample comprises only non-text content, this non-text content is fed to the second deep learning neural network, for its training (see FIG. 5, in this case only path 51 is carried out). In path 51, the method of FIG. 4A can be performed to train and to update the second deep learning neural network.

If the sample comprises only a source code describing the webpage, without non-text content being present in the webpage, text content is provided based on the source code and is fed to the first deep learning neural network, for its training (see FIG. 5, in this case only path 52 is performed). In path 52, the method of FIG. 3 can be performed to train and to update the first deep learning neural network.

If the sample comprises both a source code and non-text content, both paths 51 and 52 can be carried out, either at the same time, or sequentially.

The method described in FIG. 5 can be performed iteratively (see arrow 53 in FIG. 5), and the system 30 then selects a new sample from the training set.

In a non-limiting example, millions of samples are used to train the first and the second deep learning neural networks.

According to some embodiments, the first deep learning neural network and the second deep learning neural network are trained separately.

For example, during a first phase, the system 30 sends data only to the first deep learning neural network for its training (as explained e.g. with reference to FIG. 3A). If non-text content is present in the sample, this data can be ignored. Once the training of the first deep learning neural network is completed, the system 30 can then switch, in a second phase, to the training of the second deep learning neural network (as explained e.g. with reference to FIG. 4). In this second phase, the text content present in the source code is ignored and only the non-text content is provided and fed to the second deep learning neural network for its training.

In another example, the first deep learning neural network and the second deep learning neural network are trained separately by two different training systems 30 (first training system and second training system), according to the training methods described previously. The training of these two deep learning neural networks can thus be performed simultaneously or at different times, and/or at different locations.

The first training system which is used to train the first deep learning neural network extracts only text content from the source code of the samples, and ignores the non-text content, whereas the second training system which is used to train the second deep learning neural network extracts only non-text content from the samples, and ignores the text content present in the source code.

If necessary, a first malicious webpages detector comprising only the first deep learning neural network is trained by the first training system, and a second malicious webpages detector comprising only the second deep learning neural network is trained by the second training system. The malicious webpages detector is then built by combining the first deep learning neural network as trained and the second malicious webpages detector as trained.

In another example, a first training set comprising malicious samples and non-malicious samples is built so as to comprise only source codes of the webpages. This can be performed e.g. by a pre-processing of the samples. This first training set is then used to train only the first deep learning neural network, according to the training methods described previously. A second training set comprising malicious samples and non-malicious samples is built so as to comprise only non-text content originating from the webpages. This can be performed e.g. by a pre-processing of the samples. This second training set is then used to train only the second deep learning neural network, according to the training methods described previously.

Figure 6:
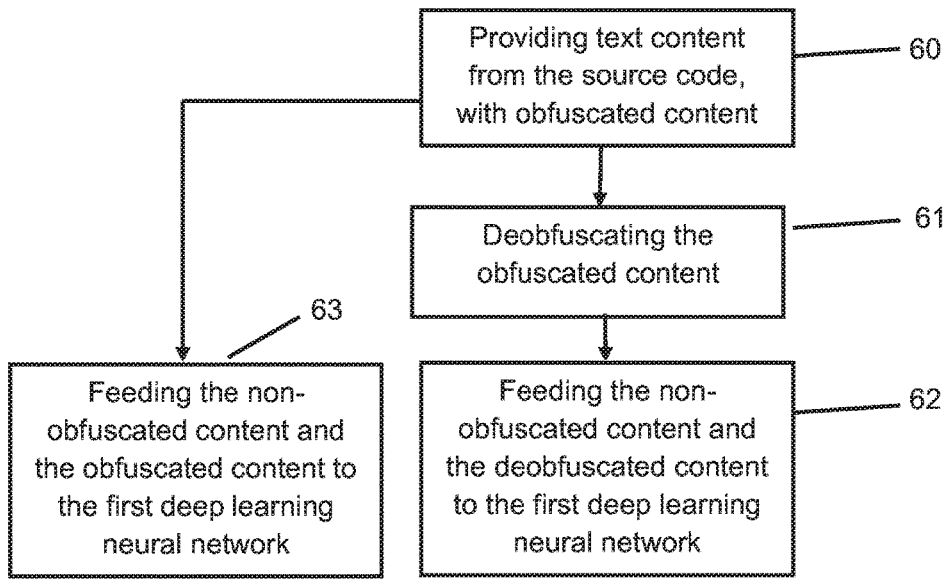
FIG. 6 illustrates an embodiment of a method of processing text content of the source code of a webpage, for the training of the malicious webpages detector, wherein the text content comprises obfuscated content.
Figure 7:
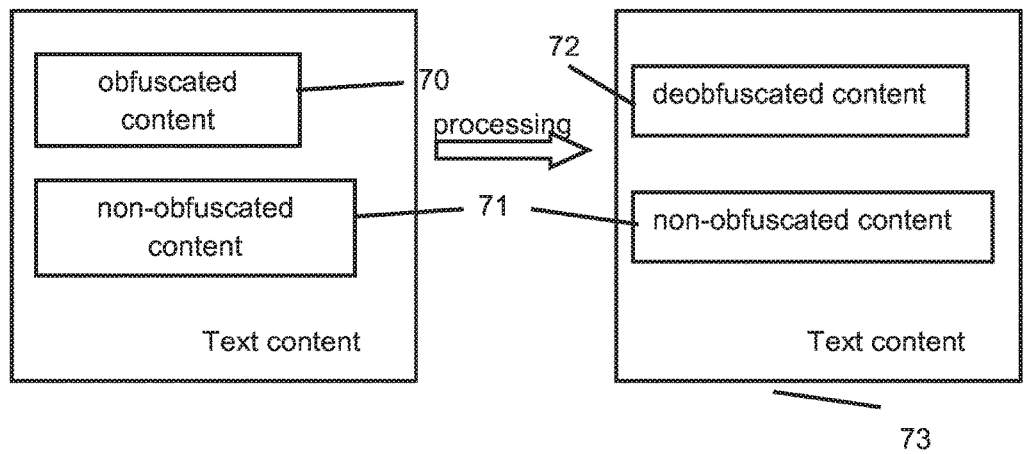
FIG. 7 illustrates the text content before and after its processing according to the method of FIG. 6.

Attention is now drawn to FIGS. 6 and 7, which describe an embodiment of a method of processing text content of the source code of a webpage, for the training of the malicious webpages detector. This method can be performed e.g. by the system 30 of FIG. 3, or by another processing unit.

A step 60 can comprise providing text content from at least a source code of the webpage represented by the sample. Step 60 is similar to step 36 described with reference to FIG. 3.

In this particular embodiment, the text content as extracted from the source code comprises non-obfuscated content 70 and obfuscated content 71 (see FIG. 7).

Obfuscation is the deliberate act of creating obfuscated code, i.e. source code that is difficult for humans to understand.

The method can comprise the step 61 of deobfuscating said obfuscated content. Dedicated tools are available to perform deobfuscating of files, such as "JavaScript Deobfuscator". Other tools can be used.

This outputs expanded text content 73 comprising the original non-obfuscated content 71 and the deobfuscated content 72 (see FIG. 7).

The expanded text content 73 can then be fed to the first deep learning neural network, for determining the prospects of whether said text content constitutes malicious content, as explained e.g. with reference to FIG. 3A.

This methods allows enriching the input that is fed to the malicious webpages detector, for its training.

According to some embodiments, the text content comprises only obfuscated content. In this case, the obfuscated content can be deobfuscated to obtain expanded text content 73, and only this expanded text content 73 is fed to the first deep learning neural network.

According to some embodiments, even if the text content as extracted from the source code comprises non-obfuscated content and obfuscated content, the text content is fed as such to the first deep learning network for its training (that is to say without deobfuscating the obfuscated content, see step 63 in FIG. 6). The training can then be performed using e.g. the method described with reference to FIG. 3A. This also applies to the case wherein the text content comprises only obfuscated content, which can thus be fed as such to the first deep learning network for its training.

According to some embodiments, if the text content as extracted from the source code comprises non-obfuscated content and obfuscated content, the training can be performed using, as input:
- a first input comprising the non-obfuscated content and the deobfuscated content (which corresponds to the obfuscated content after it has been deobfuscated), and
- a second input comprising the non-obfuscated content and the obfuscated content as such, without deobfuscating it.

According to some embodiments, the first input and the second input can be fed in parallel to the first deep learning neural network, for its training. According to other embodiments, the first input and the second input are both fed to the first deep learning neural network but not at the same time, for its training.

According to some embodiments, the text content comprises only obfuscated content. In this case, the first input comprises only deobfuscated content (which corresponds to the obfuscated content after it has been deobfuscated), and the second input comprises only the obfuscated content as such, without deobfuscating it.

Figure 8:
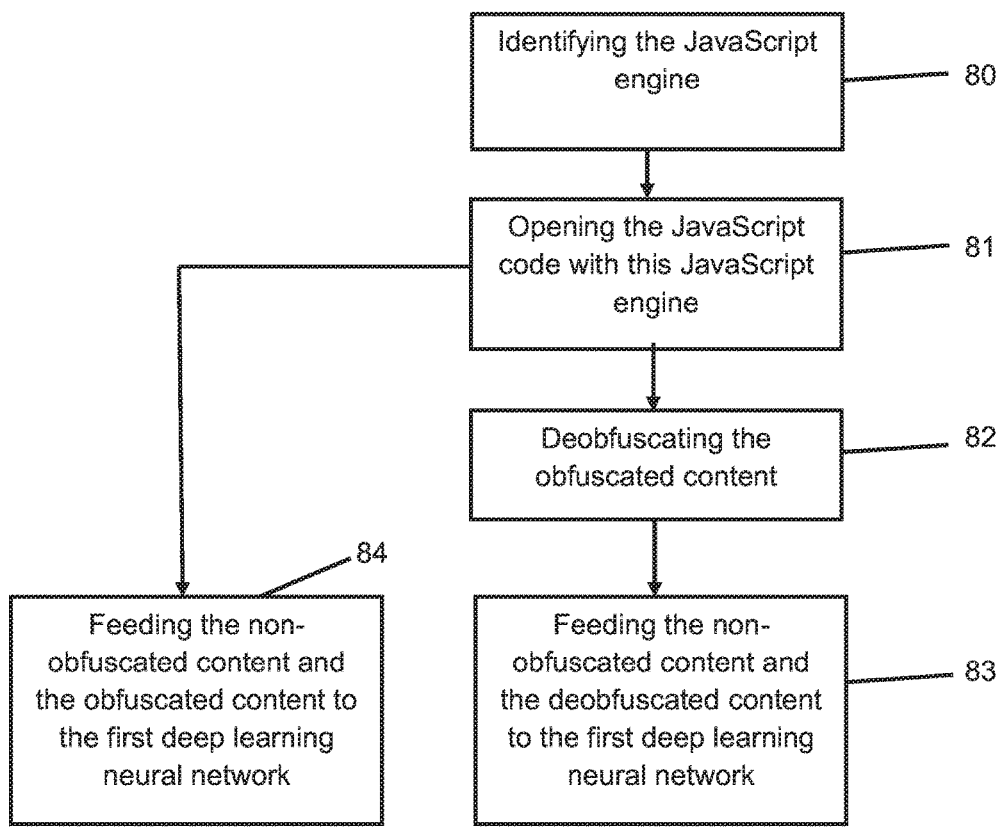
FIG. 8 illustrates additional steps that can be performed in addition to the steps described with reference to FIG. 6.

FIG. 8 illustrates other steps that can be performed for processing the text content before feeding it to the malicious webpages detector, in addition to the steps described with reference to FIG. 6.

In this embodiment, the example of a source code coded in JavaScript will be used, but it is to be understood that the method can be applied to other programming languages. The source code of a webpage can comprise JavaScript code (which is generally comprised in a ".js" file).

The method can comprise a step 80 of identifying for which JavaScript engine the JavaScript code was created. Indeed, a JavaScript code can exploit a vulnerability of a given JavaScript engine, which is not present in another JavaScript engines. For example, the JavaScript code can be made to exploit a vulnerability of the Javascript engine of the "Chrome" browser, which is not present in the "Internet Explorer" browser. Various different JavaScript engines exist on the market. In addition, JavaScript engines can evolve in time. For example, the Microsoft JavaScript engine was, in its previous release, termed the "Chakra" engine, and in its new release, it is termed the "Edge" engine.

Step 80 can be performed by a processing unit based on a database which can store typical functions/files that target each JavaScript engine. A comparison between the content of the extracted text content and the database can yield an indication on the correct JavaScript engine(s) for which the obfuscated code was built.

The method can then comprise a step 81 of opening the JavaScript code with the JavaScript engine which was identified at previous step 80.

The method can comprise a step 82 of deobfuscating the portion of the JavaScript code which is obfuscated (similarly to step 61) and a step 83 of feeding the non-obfuscated content and the deobfuscated content to the first deep learning neural network for its training (similarly to step 62).

Thus, according to some embodiments, the malicious webpages detector 10 can be trained to detect malicious webpages even if their source code comprises obfuscated content.

According to some embodiments, and as shown e.g. in FIG. 8 (see step 84), the obfuscated content can be fed as such (that is to say without deobfuscating it) together with the non-obfuscated content to the first deep learning neural network for its training.

According to some embodiments, a first input comprising the non-obfuscated content and the obfuscated content after it has been deobfuscated is fed to the first deep learning neural network and a second input comprising the non-obfuscated content and the obfuscated content is fed to the first deep learning neural network for its training. The first input and the second input can be fed at the same time, or at different time.

The method of FIG. 8 can be applied similarly to examples in which the text content comprises only obfuscated content.

Figure 9:
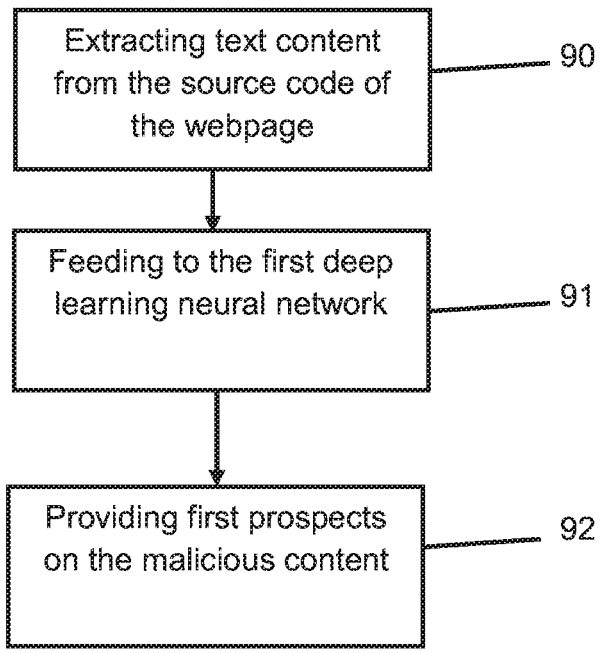
FIG. 9 illustrates an embodiment of a method of detecting that a webpage is malicious.

Attention is now drawn to FIG. 9, which describes an embodiment of a method of processing the non-text content of the samples of the training set. This method can be performed by the system 30 or by another adapted processing unit.

As mentioned above with reference e.g. to FIG. 4, non-text content can be present in the sample representing the webpage, such as images, animated content, etc.

The method can comprise the step 90 of extracting raw binary data from each file which was identified as being part of the non-text content of the webpage. It is known that each file comprises a sequence of bytes, each byte comprising eight bits. The raw binary data can comprise at least part of this sequence of bytes.

Methods of detecting malicious webpages using the malicious webpages detector (such as the malicious webpages detector 10 illustrated in FIG. 1) will now be described. These methods can use e.g. the malicious webpages detector after it was trained according to one or more of the training methods described previously.

Figure 10:
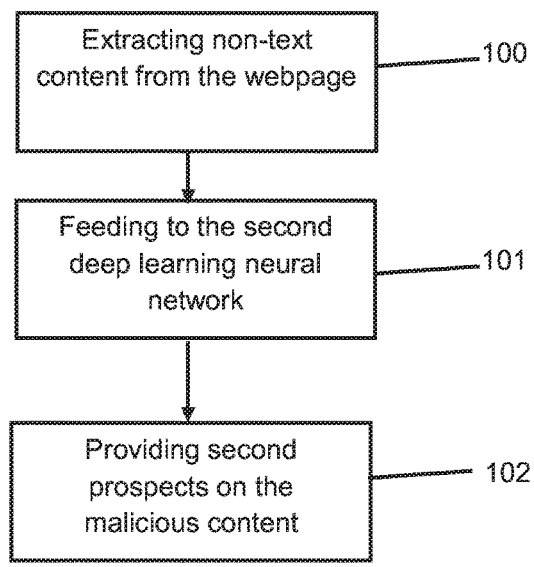
FIG. 10 illustrates an embodiment of another method of detecting that a webpage is malicious, which can be combined with the method of FIG. 9.

A possible embodiment of a method of detection is illustrated in FIG. 10. The method can be performed by the malicious webpages detector, or at least part of the steps of the method are performed by another processing unit in communication with the malicious webpages detector.

When a user attempts to access a webpage (such as by using a browser on a computer), the method can comprise a step 90 of extracting text content from at least a source code of the webpage (e.g. before the browser executes the source code for displaying the webpage). As mentioned above, the source code of a webpage can be accessed for example by the browser.

The text content which is extracted from the source code of the webpage can be for example the raw text content of the source code, which is extracted integrally or at least partially. This extraction can be performed similarly to what was described in the training methods (see e.g. step 36 in FIG. 3A).

The method can comprise a step 91 of feeding the extracted text content to the malicious webpages detector, and in particular to the first deep learning neural network.

The first deep learning neural network can then provide first prospects (step 92) of whether said text content constitutes malicious content, that is to say that the first deep learning neural network 92 attempts to provide prospects of whether the text content originates from a malicious webpage. These first prospects are provided by the deep learning algorithm present in the first deep learning neural network 11.

The first prospects can comprise for example a probability (e.g. a probability $X_1$ that the text content constitutes malicious content, and/or a probability $1-X_1$ that the text content constitutes non-malicious content).

Figure 9A:
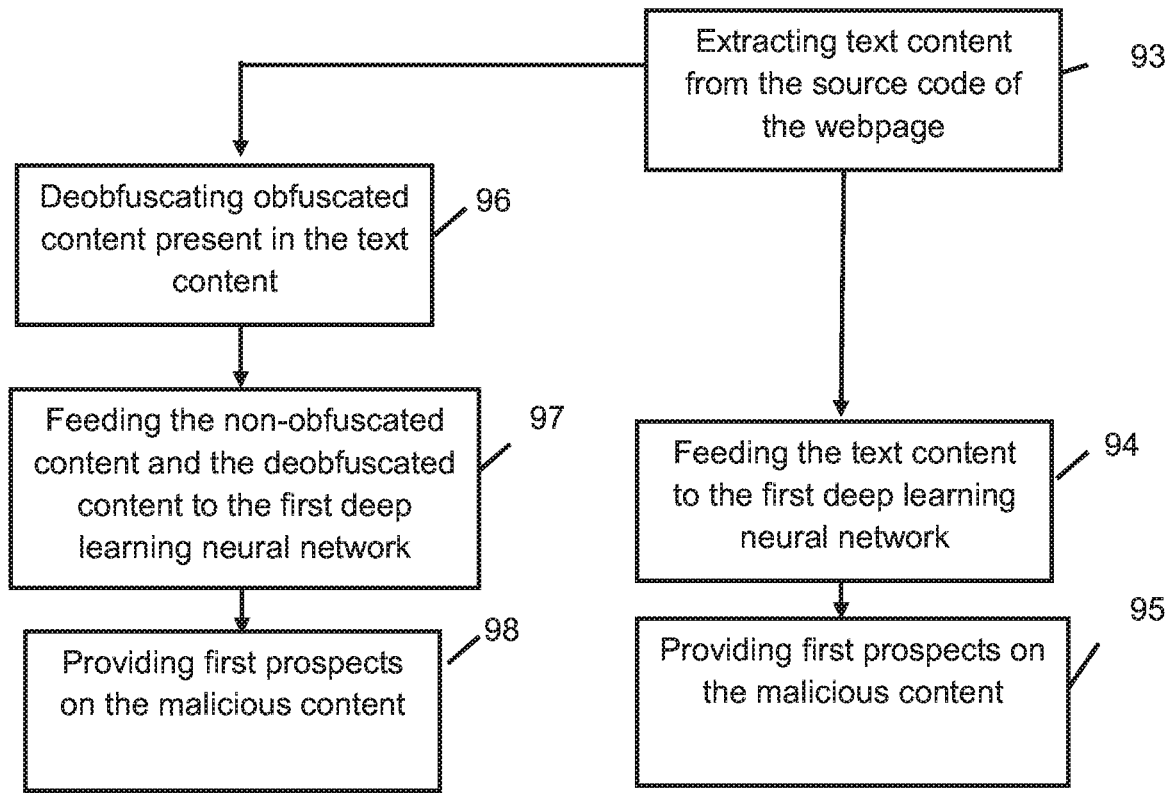
FIG. 9A illustrates an embodiment of a method of detecting that a webpage is malicious, wherein the source code of the webpage comprises obfuscated content.

As illustrated in FIG. 9A, if the text content comprises obfuscated content and non-obfuscated content, the method can comprise a step 96 of deobfuscating the obfuscated content present in the text content. Examples of methods of deobfuscating the obfuscated content present in the text content were described e.g. with respect to step 61 of FIG. 6.

The method can then comprise a step 97 of feeding the non-obfuscated content and the deobfuscated content to the malicious webpages detector, and in particular to the first deep learning neural network. The first deep learning neural network can then provide first prospects (step 98) of whether said text content constitutes malicious content, that is to say that the first deep learning neural network 98 attempts to provide prospects of whether the text content originates from a malicious webpage.

According to some embodiments (see steps 94 and 95 in FIG. 9A), the text content which comprises obfuscated content and non-obfuscated content is fed as such to the first deep learning neural network (that is to say that the obfuscated content is not deobfuscated). The first deep learning neural network can then provide first prospects (step 98) of whether said text content constitutes malicious content.

Depending on the embodiments:
 steps 96 to 98 are performed in parallel to steps 94 to 95, or
 steps 96 to 98 are performed in addition to steps 94 and 95 but not necessarily at the same time, or
 only steps 96 to 98 are performed, and not steps 94 and 95, or
 only steps 94 and 95 are performed, and not steps 96 to 98.

The method also applies similarly if the text content comprises only obfuscated content. In this case, in step 97, only deobfuscated content (which corresponds to the obfuscated content after it has been deobfuscated) is fed to the first deep learning neural network. In step 94, only obfuscated content is fed to the first deep learning neural network.

As shown in FIG. 10, depending on the content of the webpage, the method can also comprise a step 100 of extracting non-text content from the webpage. This step 100 can be similar to step 42 of FIG. 4.

Figure 11:
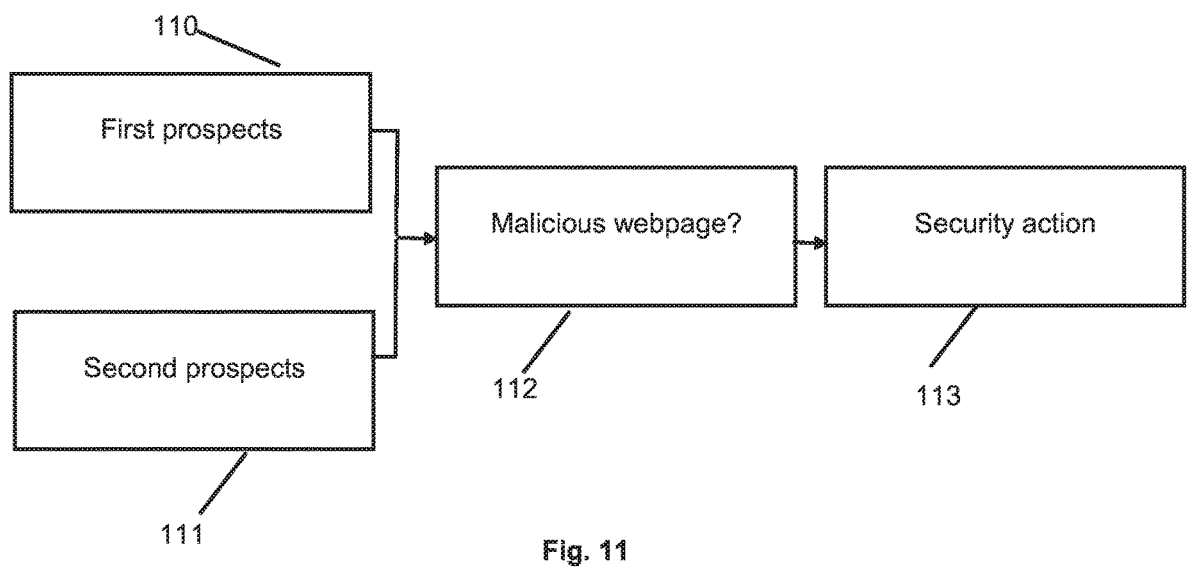
FIG. 11 illustrates an embodiment of a method of detecting that a webpage is malicious based on the methods of FIGS. 9 and 10.

If the malicious webpage detector detects that the webpage does not comprise non-text content, the steps of FIG. 11 can be omitted.

As mentioned above, the non-text content which is extracted can comprise a ".JPEG" file, a ".AVI" file, a Flash file, a GIF file, etc. These examples are however not limitative. Embodiments for extracting the non-text content were described e.g. with reference to FIG. 4.

The non-text content can then be fed (step 101) to the second deep learning neural network. This step 101 can be similar to step 43 of FIG. 4, described for the training method.

According to some embodiments, binary data present in the files identified as belonging to the non-text content of the webpage are fed to the second deep learning neural network. According to some embodiments, the size of the binary data can be reduced, e.g. by using the method described with reference to FIG. 9.

The second deep learning neural network then provides prospects (step 102) of whether said non-text content constitutes malicious content. These second prospects can be provided by the deep learning algorithm present in the second deep learning neural network.

The second prospects can comprise for example a probability (e.g. a probability $X_2$ that the non-text content constitutes malicious content, and/or a probability $1-X_2$ that the non-text content constitutes non-malicious content).

The methods of FIGS. 9 and 10 can be performed at the same time or sequentially.

As shown in FIG. 11, the malicious webpages detector can detect that a webpage is malicious (step 112) based on the first prospects 110 and/or based on the second prospects 111. An aggregation of the first and second prospects 110, 111 can be performed, according to some predefined rules.

For example, if at least one of the first prospects and the second prospects does not comply with a predefined criteria, the malicious webpages detector can detect that a webpage is malicious. For example, if at least one of the first prospects and the second prospects is above a threshold $T_{min}$, that is to say $X_1 > T_{min}$ or $X_2 > T_{min}$, (or below a threshold $T_{max}$, that is to say $1-X_1 < T_{max}$, or $1-X_2 < T_{max}$), the malicious webpages detector detects that the webpage is malicious (see step 113). Other aggregation rules can be used.

If this is not the case, the malicious webpages detector detects that the webpage is not malicious, and the user can access the webpage. The malicious webpages detector can for example send information to the browser or to the computer of the user to indicate that the webpage is not malicious. It can also perform no action, which indicates by default to the browser that the webpage is not malicious.

According to some embodiments, if the malicious webpages detector has detected that the webpage is malicious, it can trigger a security action 113. For example, the user can be prevented from accessing the webpage, or can get only limited access to the webpage (such as e.g. only to the content which is not malicious). The security action 113 can be performed e.g. by a dedicated module (not represented) running on a processing unit, or by the malicious webpages detector, or by another processing unit.

According to some embodiments, the malicious webpages detector is operable for a plurality of different browsers. For example, the user can use different browsers (Chrome, Safari, Internet Explorer, etc.), and the same malicious webpages detector can be used to protect the user from malicious webpages, although some of the webpages are malicious only for Chrome, and other webpages only for Safari, etc. This also applies to a plurality of different users who use each different browsers and can be protected by the same malicious webpages detector.

According to some embodiments, the malicious webpages detector is operable for a plurality of different operating systems. For example, the same malicious webpages detector can protect different users using different operating systems, or the same user using different operating systems alternatively.

According to some embodiments, the malicious webpages detector is operable for a plurality of different programming languages of webpages. For example, the same malicious webpages detector can protect the user from malicious webpages coded using different programming languages, such as Javascript, HTML, JAVA, or a combination of different programming languages (this list is however not limitative).

Figure 12A:
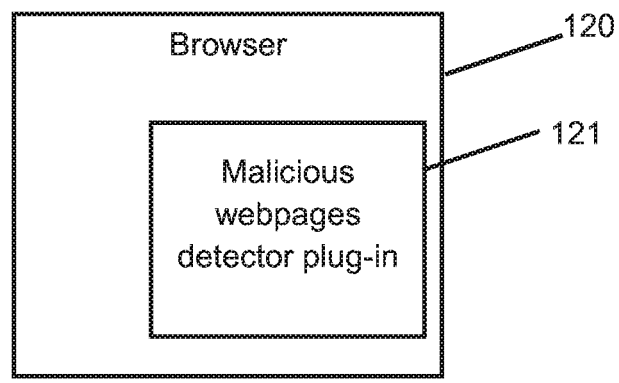
FIG. 12A illustrates an embodiment in which the malicious webpages detector is embedded as a plug-in of a browser of the user.

Attention is now drawn to FIG. 12A.

As illustrated in FIG. 12A, according to some embodiments, the malicious webpages detector can be embedded as a plug-in 121 of the browser 120 of the user.

Figure 12B:
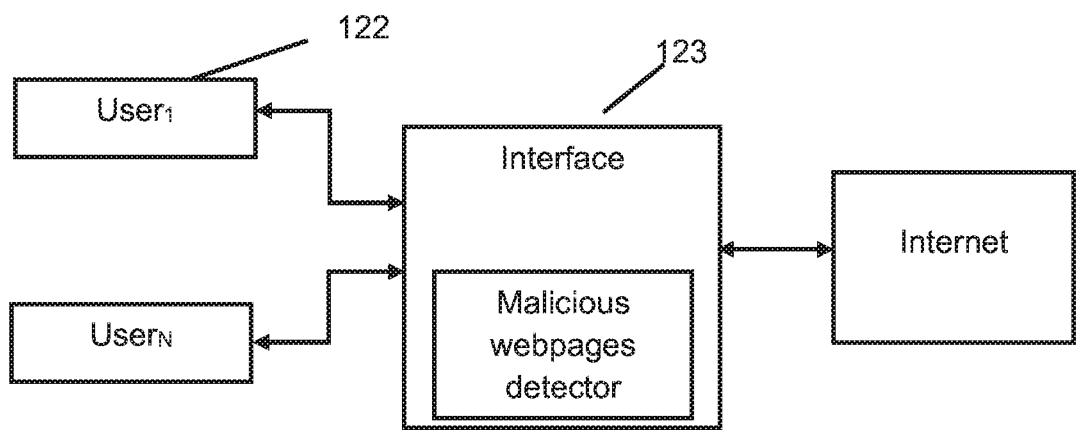
FIG. 12B illustrates an embodiment in which the malicious webpages detector can be located at an interface between a group of users and the Internet network.

According to other embodiments, and as illustrated in FIG. 12B, the malicious webpages detector can be located at an interface 123 between a group of users 122 and the (Internet) network. For example, the interface 123 can be a proxy server, a network gateway, etc. (this list being not limitative). In this embodiment, the malicious webpages detector thus protects a plurality of different users.

Figure 13:
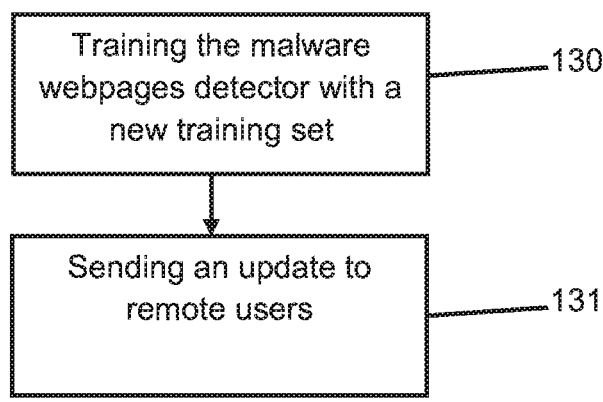
FIG. 13 illustrates a method of updating the malicious webpages detector.

FIG. 13 illustrates a method of updating the malicious webpages detector.

From time to time, the malicious webpages detector can be trained using a new training set (such as comprising new malicious webpages and/or non-malicious webpages). The first and second neural networks can be updated using the various training methods described previously.

According to some embodiments, the malicious webpages detector can be trained at a central location (step 130), and then an update is sent to remote users (step 131). According to some embodiments, only the first deep neural network or only the second deep neural network is updated and a corresponding update is sent to remote users.

The updated version of the first and second neural networks (or of the parameters of said networks which were updated during the last training phase) can be sent to the remote users, in order to update their malicious webpages detector.

According to some embodiments, periodic/automatic updates of the malicious webpages detector are sent to the remote users, e.g. via the Internet.

Although the training and the detection methods have been described for "webpages", these methods also apply to "websites" comprising a plurality of webpages.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A method of training a malicious webpages detector, wherein a malicious webpages detector comprises at least a first deep learning neural network and a second deep learning neural network operable on at least a processing unit, the method comprising:
    providing a first subset of samples, each sample representing at least a malicious webpage,
    providing a second subset of samples, each sample representing at least a non-malicious webpage,
    training the malicious webpages detector to detect malicious webpages, said training comprising, for each sample of a plurality of samples of said first and second subsets:
    providing text content from at least a source code of the webpage represented by said sample,
    providing prospects of whether said text content constitutes malicious content, using the first deep learning neural network,
    updating parameters of the first deep learning neural network based at least on a comparison between the prospects provided by said first deep learning algorithm neural network and whether the text content constitutes malicious or non-malicious content,
    providing non-text content from said sample,
    providing prospects of whether said non-text content corresponds to malicious content, using the second deep learning neural network, and
    updating parameters of the second deep learning neural network based at least on a comparison between the prospects provided by said second deep learning neural network and whether the non-text content constitutes malicious or non-malicious content.

2. The method of claim 1, comprising at least one of:
extracting the whole raw text content of the source code of the webpage represented by said sample, or at least part of the text content of said source code, and extracting non-text content from each sample.

3. The method of claim 1, comprising providing data on each sample of the first subset, said data indicating if at least one of the text content and the non-text content of each sample constitutes malicious content.

4. The method of claim 1, wherein both the text content and the non-text content of each sample of the first subset constitute malicious content.

5. The method of claim 1, wherein at least one of:
at least a first group of samples of at least one of said first and second subsets represents webpages which are coded using at least a first programming language, and a second group of samples of at least one of said first and second subsets corresponds to webpages which are coded using at least a second programming language, the first programming language being different from the second programming language,
a first group of samples of said first subset represents webpages which are malicious for a first web browser, and a second group of samples of said first subset corresponds to webpages which are malicious for a second web browser, the first web browser being different from the second web browser, and
a first group of samples of said first subset represents webpages which are malicious for a first operating system, and a second group of samples of said first subset corresponds to webpages which are malicious for a second operating system, the first operating system being different from the second operating system.

6. The method of claim 1, wherein at least the first deep learning neural network comprises a Recurrent Neural Network, a Convolutional Neural Network or a Fully Connected Deep Neural Network.

7. The method of claim 1, wherein at least the first deep learning neural network comprises is a Long Short-Term Memory network.

8. The method of claim 1, comprising:
extracting text content from at least a source code of the webpage represented by said sample, wherein the text content comprises non-obfuscated content and obfuscated content, or only obfuscated content,
deobfuscating said obfuscated content, and
feeding the non-obfuscated content and the deobfuscated content, or only the deobfuscated content, to the first deep learning neural network, for determining the prospects of whether said text content constitutes malicious content.

9. A method of training a malicious webpages detector, wherein the malicious webpages detector comprises at least one deep learning neural network operable on a processing unit, the method comprising:
providing a first subset of samples, each sample representing at least part of a malicious webpage,
providing a second subset of samples, each sample representing at least part of a non-malicious webpage,
training the malicious webpages detector to detect malicious webpages, said training comprising, for each sample of a plurality of samples of the first and the second subsets:
extracting an entire raw text content of source code of the webpage represented by the sample,
providing prospects of whether the extracted text content constitutes malicious content, using said deep learning neural network, and
updating parameters of said deep learning neural network based at least on a comparison between the prospects provided by said deep learning algorithm neural network and whether the text content constitutes malicious or non-malicious content.

10. The method of claim 9, wherein each sample is said raw text content.

11. A method of training a malicious webpages detector, wherein the malicious webpages detector comprises at least one deep learning neural network operable on a processing unit, the method comprising:
providing a first subset of samples, each sample representing at least part of a malicious webpage,
providing a second subset of samples, each sample representing at least part of a non-malicious webpage,
training the malicious webpages detector to detect malicious webpages, said training comprising, for each sample of a plurality of samples of the first and the second subsets:
providing prospects of whether non-text content of the sample constitutes malicious content, using said deep learning neural network,
updating parameters of said deep learning neural network based at least on a comparison between the prospects provided by said deep learning algorithm neural network and whether the non-text content constitutes malicious or non-malicious content.

12. The method of claim 11, comprising, for each sample, extracting non-text content from said sample.

13. The method of claim 11, wherein each sample is said non-text content.

14. A system for training a malicious webpages detector, wherein the malicious webpages detector comprises at least a first deep learning neural network and a second deep learning neural network operable on at least a processing unit, the system comprising:
a database storing
a first subset of samples, each sample representing at least a malicious webpage, and
a second subset of samples, each sample representing at least a non-malicious webpage,
wherein the system is configured to train the malicious webpages detector to detect malicious webpages, said training comprising, by a processing unit, for each sample of a plurality of samples of the first and the second subsets:
providing text content from at least a source code of the webpage represented by said sample,
providing prospects of whether said text content constitutes malicious content, using the first deep learning neural network,
updating parameters of the first deep learning neural network based at least on a comparison between the prospects provided by said first deep learning algorithm neural network and whether the text content constitutes malicious or non-malicious content,
providing non-text content from said sample,
providing prospects of whether said non-text content corresponds to malicious content, using the second deep learning neural network,
updating parameters of the second deep learning neural network based at least on a comparison between the prospects provided by said second deep learning neural network and whether the non-text content constitutes malicious or non-malicious content.

15. The system of claim 14, configured to extract at least one of:
   the whole raw text content of the source code of the webpage represented by said sample, or at least part of said source code, and
   non-text content from each sample.

16. The system of claim 14, wherein the database is configured to store information on each sample of the first subset, said information indicating if at least one of the text content and the non-text content of each sample constitutes malicious content.

17. The system of claim 14, wherein both the text content and the non-text content of each sample of the first subset constitute malicious content.

18. The system of claim 14, wherein at least one of:
   a first group of samples of at least one of said first and second subsets represents webpages which are coded using at least a first programming language, and a second group of samples of at least one of said first and second subsets corresponds to webpages which are coded using at least a second programming language, the first programming language being different from the second programming language,
   a first group of samples of said first subset represents webpages which are malicious for a first web browser, and a second group of samples of said first subset corresponds to webpages which are malicious for a second web browser, the first web browser being different from the second web browser, and
   a first group of samples of said first subset represents webpages which are malicious for a first operating system, and a second group of samples of said first subset corresponds to webpages which are malicious for a second operating system, the first operating system being different from the second operating system.

19. The system of claim 14, wherein at least the first deep learning neural network comprises a Recurrent Neural Network, a Convolutional Neural Network or a Fully Connected Deep Neural Network.

20. The system of claim 14, wherein at least the first deep learning neural network comprises is a Long Short-Term Memory network.

21. The system of claim 14, configured to:
   extract text content from at least a source code of the webpage represented by said sample, wherein the text content comprises non-obfuscated content and obfuscated content, or only obfuscated content,
   deobfuscate said obfuscated content, and
   feed the non-obfuscated content and the deobfuscated content, or only the deobfuscated content, to the first deep learning neural network, for determining the prospects of whether said text content constitutes malicious content.

22. A system for training a malicious webpages detector, wherein the malicious webpages detector comprises at least one deep learning neural network operable on a processing unit, the system comprising:
   a database storing
      a first subset of samples, each sample representing at least part of a malicious webpage,
      a second subset of samples, each sample representing at least part of a non-malicious webpage,
   wherein the system is configured to train the malicious webpages detector to detect malicious webpages, said training comprising, by a processing unit, for each sample of a plurality of samples of the first and the second subsets:
      providing prospects of whether non-text content of the sample constitutes malicious content, using said deep learning neural network, and
      updating parameters of said deep learning neural network based at least on a comparison between the prospects provided by said deep learning algorithm neural network and whether the non-text content constitutes malicious or non-malicious content.

* * * * *